(12) United States Patent
Pinault

(10) Patent No.: US 6,658,500 B1
(45) Date of Patent: Dec. 2, 2003

(54) MICROCHIP CARD FOR ACCESSING A REMOTE APPLICATION, ASSOCIATED COMMUNICATION SYSTEM AND TERMINAL AND METHOD OF ACCESSING THE REMOTE APPLICATION BY MEAN OF THE MICROCHIP CARD

(75) Inventor: Francis Pinault, Bois-Colombes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/395,173

(22) Filed: Sep. 14, 1999

(30) Foreign Application Priority Data

Sep. 21, 1998 (FR) .............................. 98 11745

(51) Int. Cl.⁷ .............................. G06F 3/00; G06F 3/06; G06F 13/42

(52) U.S. Cl. .............................. 710/11; 710/14; 710/38; 710/62; 710/64; 710/72; 710/74; 710/105; 710/15; 710/16; 710/41; 709/200; 709/201; 709/203; 709/217; 709/218; 709/219; 709/227; 709/228; 709/229; 709/230; 709/238; 709/250; 455/557; 455/558

(58) Field of Search .............................. 705/1, 21, 26, 705/27, 41, 42, 44; 709/200, 201, 203, 207, 216–219, 227–230, 238, 240, 242, 245, 250; 710/3, 5, 11, 14, 20, 36, 38, 62, 63, 64, 72, 74, 105, 15, 16; 455/557, 558

(56) References Cited

U.S. PATENT DOCUMENTS

| | | | |
|---|---|---|---|
| 5,335,276 A | * 8/1994 | Thompson et al. | 380/266 |
| 5,349,649 A | * 9/1994 | Iijima | 709/228 |
| 5,537,417 A | * 7/1996 | Sharma et al. | 709/228 |
| 5,581,708 A | 12/1996 | Iijima | |
| 5,586,166 A | * 12/1996 | Turban | 455/558 |
| 5,649,001 A | * 7/1997 | Thomas et al. | 379/93.07 |
| 5,678,029 A | 10/1997 | Iijima | |
| 5,694,455 A | * 12/1997 | Goodman | 379/59 |
| 5,742,845 A | * 4/1998 | Wagner | 710/11 |
| 5,748,915 A | * 5/1998 | Iijima | 710/105 |
| 5,884,168 A | * 3/1999 | Kolev et al. | 455/432.1 |
| 5,903,729 A | * 5/1999 | Reber et al. | 709/219 |
| 5,909,596 A | * 6/1999 | Mizuta | 710/63 |
| 5,938,726 A | * 8/1999 | Reber et al. | 709/217 |
| 5,986,651 A | * 11/1999 | Reber et al. | 345/335 |
| 5,995,105 A | * 11/1999 | Reber et al. | 345/356 |
| 6,002,946 A | * 12/1999 | Reber et al. | 455/557 |
| 6,031,977 A | * 2/2000 | Pettus | 395/200.6 |

(List continued on next page.)

FOREIGN PATENT DOCUMENTS

| | | |
|---|---|---|
| EP | 0 513 507 A1 | 11/1992 |
| EP | 0 733 992 A2 | 9/1996 |
| EP | 0 807 911 A2 | 11/1997 |
| FR | 2 657 445 A1 | 7/1991 |
| FR | 2 686 998 A1 | 8/1993 |

*Primary Examiner*—Jeffrey Gaffin
*Assistant Examiner*—Tanh Q. Nguyen
(74) *Attorney, Agent, or Firm*—Sughrue Mion, PLLC

(57) ABSTRACT

A microchip card enables a user to access at least one chosen application on a particular server by means of any communication terminal using at least one mode of communication and fitted with a reader compatible with the microchip card. The card includes memory for storing sets of parameters specific to the mode(s) of communication used by the terminal and to the chosen application(s) and a system which can recognize the mode(s) of communication the terminal in which it is inserted can use. A selector system connected to the memory and to the recognition system selects a set of parameters corresponding to a recognized mode of communication of the terminal and to the chosen application. The selected parameter set is delivered to the terminal to enable access to the chosen application from that terminal.

13 Claims, 2 Drawing Sheets

U.S. PATENT DOCUMENTS

| | | | |
|---|---|---|---|
| 6,032,130 A | * | 2/2000 | Alloul et al. .................. 705/27 |
| 6,041,314 A | * | 3/2000 | Davis .......................... 705/41 |
| 6,068,183 A | * | 5/2000 | Freeman et al. ............ 235/375 |
| 6,182,900 B1 | * | 2/2001 | Wiehler ...................... 235/492 |
| 6,250,557 B1 | * | 6/2001 | Forslund et al. ............ 235/492 |
| 6,256,497 B1 | * | 7/2001 | Chambers ................... 455/433 |
| 6,268,879 B1 | * | 7/2001 | Sato ........................ 348/14.01 |
| 6,286,039 B1 | * | 9/2001 | Van Horne et al. ......... 709/221 |
| 6,302,326 B1 | * | 10/2001 | Symonds et al. ........... 235/379 |
| 6,304,646 B1 | * | 10/2001 | Liot et al. ............... 379/201.04 |
| 6,317,797 B2 | * | 11/2001 | Clark et al. .................... 710/5 |
| 6,360,952 B1 | * | 3/2002 | Kimlinger et al. .......... 235/492 |

* cited by examiner

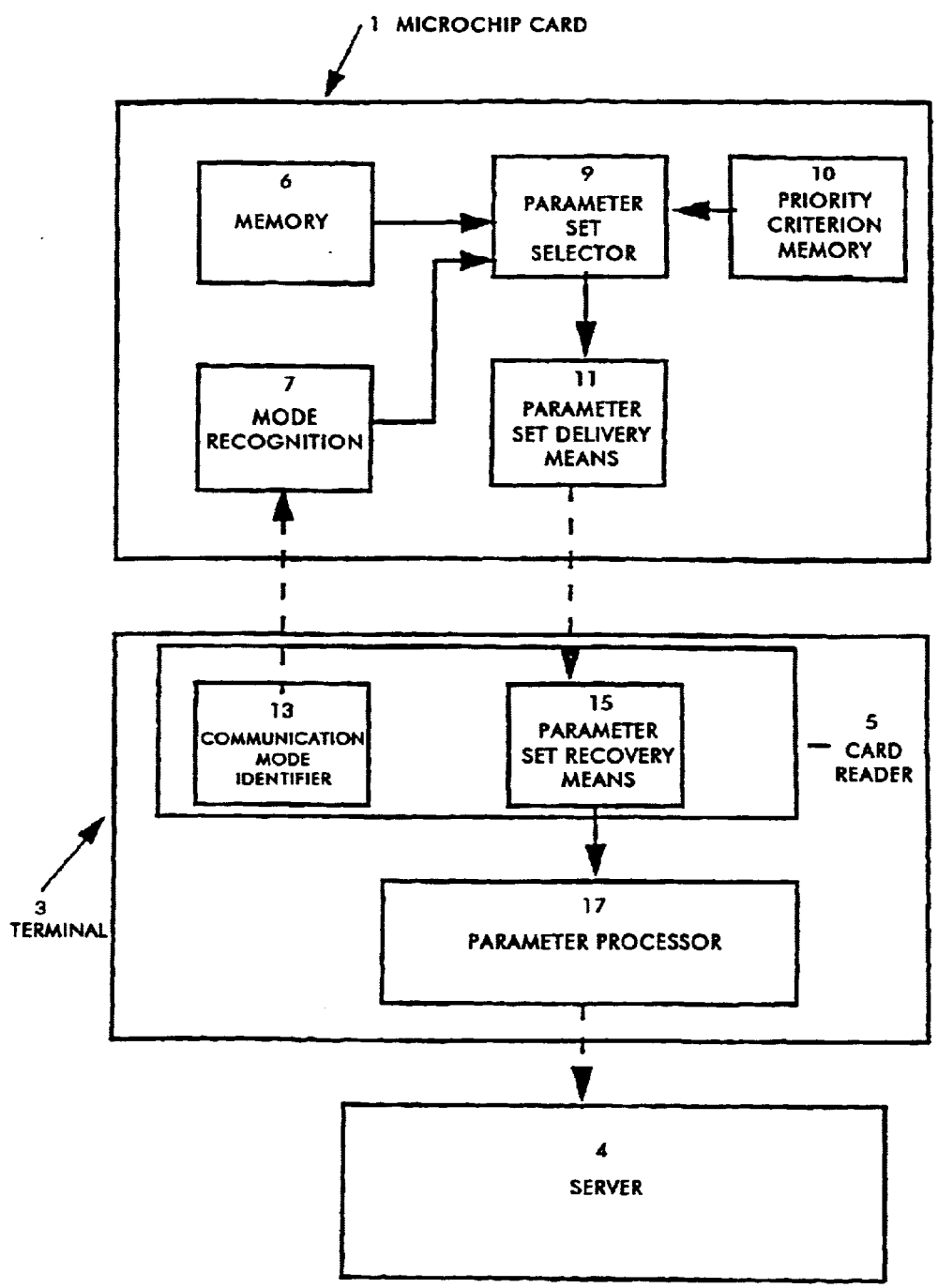

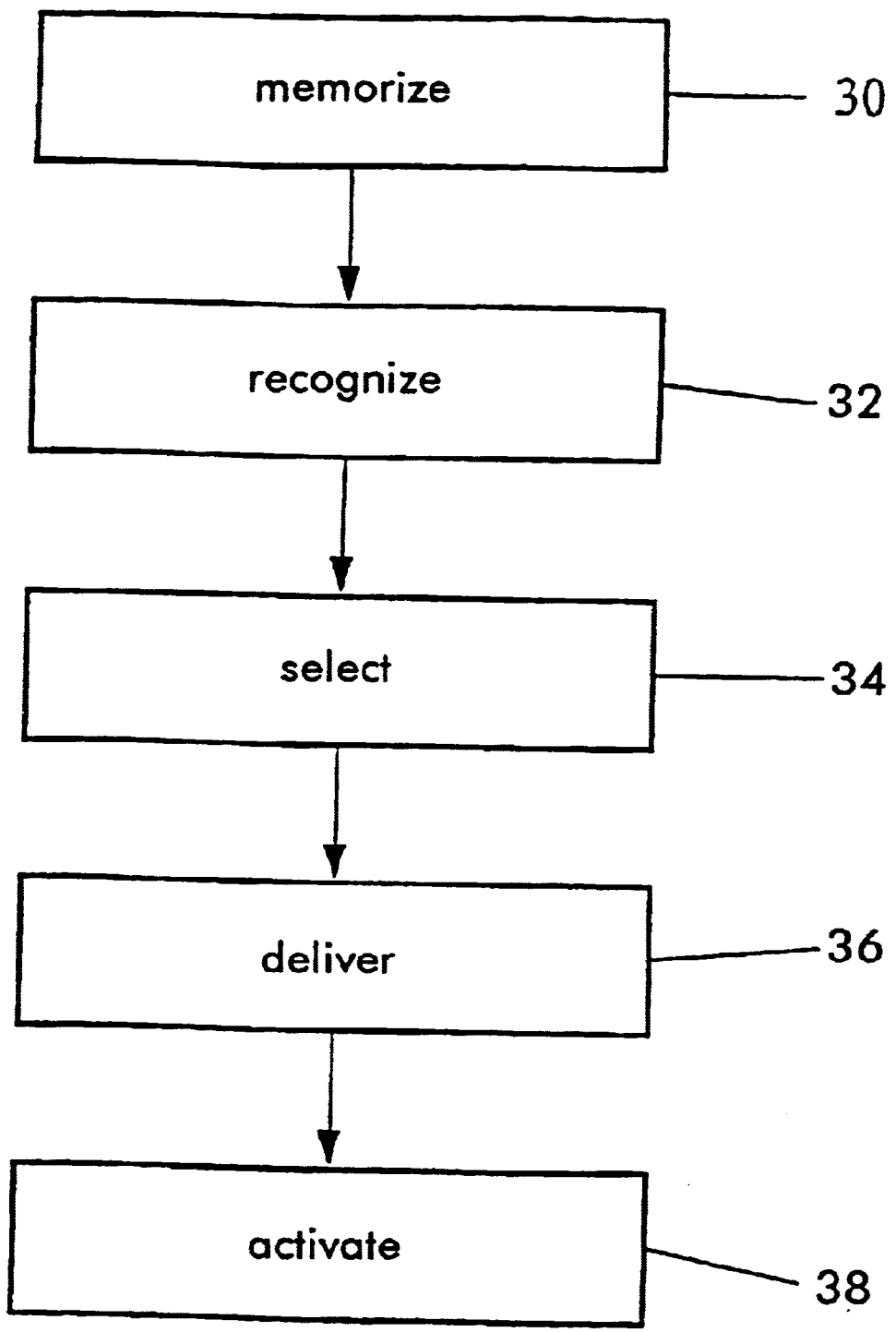

MICROCHIP CARD FOR ACCESSING A REMOTE APPLICATION, ASSOCIATED COMMUNICATION SYSTEM AND TERMINAL AND METHOD OF ACCESSING THE REMOTE APPLICATION BY MEAN OF THE MICROCHIP CARD

BACKGROUND OF THE INVENTION

1. Field of the Invention

The present invention concerns a microchip card for accessing a remote application, a terminal and a communication system associated with the microchip card, and a method of accessing the remote application using the microchip card.

More generally, the field of the invention is that of communication systems such as cable communication systems, cellular communication systems, for example the GSM (Global System for Mobile communications), cordless telephone systems, for example the DECT (Digital European Cordless Telephone) system or CTS (Cordless Telephone System), or microcomputers equipped, for example, with a multifunction modem providing access to the Internet, for example.

2. Description of the Prior Art

To offer them an improved service, more and more businesses are making remote applications available to their customers so that customers can obtain information more easily on what the business can offer them, its products and prices, for example, and carry out various transactions. For example, using various terminals such as a microcomputer fitted with an Internet access modem or a Minitel videotex terminal, customers can use an application made available to them by a bank to look up the balance of their account and perform transfers or by a travel agent to look up timetables and details of available seats and order train or plane tickets.

This situation is somewhat disconcerting for users because they have to know and to input to each terminal a multitude of parameters, for example a telephone number and an IP (Internet Protocol) or other address, which can lead to confusion, in particular if the user wants to access more than one application.

A microcomputer does not provide the same mode of access to a chosen application as a mobile telephone or a Minitel terminal, for example.

The aim of the present invention is to simplify access by a user to a remote application from any kind of terminal.

SUMMARY OF THE INVENTION

To this end, the invention consists in a microchip card for enabling a user to access at least one chosen application on a particular server by means of any communication terminal using at least one mode of communication and fitted with a reader compatible with the microchip card, which card includes:

memory means for storing sets of parameters specific to the at least one mode of communication used by the terminal and to the at least one chosen application, means for recognizing the at least one mode of communication used by the terminal in which it is inserted, means connected to the memory means and to the recognition means for selecting a set of parameters corresponding to a recognized mode of communication of the terminal and to the chosen application, and means for delivering the selected parameter set to the terminal to enable access to the chosen application, from the terminal.

The microchip card in accordance with the invention can have one or more of the following features:

each set of parameters includes an address, a protocol type, protocol parameters and data relating to security and to the right of access to the chosen application, the address and the protocol type of each set of parameters being compatible with the mode of communication or one of the modes of communication used by the terminal, if the terminal can use several communication modes, the card further comprises memory means for storing a priority criterion connected to the selector means, the priority criterion is a criterion included in the following group: the maximum transmission speed of a mode of communication, the quantity of data to be exchanged with the server, the cost of the call between the terminal and the server for a given mode of communication, its memory means comprise at least two sets of parameters respectively corresponding to two different applications.

The invention further consists in a communication terminal using at least one mode of communication and equipped with a reader compatible with a microchip card as defined above, which terminal comprises means for supplying the identity of each used mode of communication to the recognition means of the microchip card, means for recovering the set of parameters delivered by the delivery means, and means for processing the delivered set of parameters to establish access to the chosen application.

In accordance with another feature, the terminal is a terminal of one of the types from the following group: cable telephone terminal, cellular telephone terminal, cordless telephone terminal, microcomputer.

The invention further consists in a communication system which comprises at least one microchip card as defined above, at least one terminal as defined above and at least one server of at least one application.

The invention equally consists in a method of allowing a user to access at least one chosen application of a particular server by means of a communication terminal of any kind using at least one communication mode and equipped with a reader compatible with the microchip card, which method includes the following steps:

memorizing the set of parameters specific to the at least one communication mode used by the terminal and to the at least one chosen application, recognizing the at least one mode of communication used by the terminal in which it is inserted, selecting a set of parameters corresponding to a recognized communication mode of the terminal and to the at least one chosen application, and delivering the selected set of parameters to the terminal to enable access to the chosen application from the terminal.

The method of the invention may further include one or more of the following features:

each stored set of parameters includes an address, a protocol type, protocol parameters and data relating to security and to the right of access to the chosen application, the address and the protocol type of each set of parameters being compatible with a single mode of communication that can be used by the terminal, if the terminal can use more than one mode of communication, a priority criterion is taken into account in the step of selecting one of the recognized modes of communication, the priority criterion is a criterion included in the following group: the maximum speed of transmission of a mode of communication, the quantity of data to be exchanged with the server, the cost of the call between the terminal and the server for a given mode of communication, the sets of parameters are downloaded from the server of the chosen application.

Other features and advantages of the invention will emerge from the following description given with reference to the accompanying drawings, by way of example and without limiting the invention.

BRIEF DESCRIPTION OF THE DRAWINGS

FIG. 1 is a block diagram of the communication system in accordance with the invention.

FIG. 2 is a flowchart showing representative steps of the method according to the invention.

DETAILED DESCRIPTION OF THE PREFERRED EMBODIMENT

FIG. 1 is a block diagram of a communication system in accordance with the invention. The communication system comprises a microchip card 1, a terminal 3 and a server 4.

The microchip card 1 is designed to enable a user to access at least one chosen application on the server 4 via the communication terminal 3 which uses at least one mode of communication with the server 4 and includes a reader 5 compatible with the microchip card.

The communication terminal 5 is a terminal of any kind in the sense that it can be a cable telephone terminal, a cellular telephone terminal, a cordless telephone terminal or a microcomputer. The card can therefore be used with a heterogeneous group of terminals.

The various terminals from which the user can access the chosen application have the common feature that they can use at least one mode of communication and all include a reader 5 compatible with the microchip card 1.

The microchip card 1 includes memory means 6 for storing parameters specific to said at least one mode of communication used by said terminal 3 and to the chosen application. Each set of parameters includes an address, a protocol type, protocol parameters and data relating to security and to the right of the user to access the chosen application, for example. The address and the type of protocol of each set of parameters are of course suitable for one of the modes of communication used by the terminals of the heterogeneous group.

If the card 1 provides access to several different applications, the memory means 6 store one set or preferably several sets of parameters for each application.

The card 1 also includes means 7 for recognizing the mode(s) of communication used by said terminal 3 in which it is incorporated.

Also, the card 1 includes means 9 for selecting a set of stored parameters corresponding to a recognized mode of communication of said terminal and to said chosen application. The means 9 are connected to the means 6 and 7.

The selector means 9 are also connected to memory means 10 for storing a priority criterion taken into account in the selection process. A priority criterion is particularly beneficial if the terminal in which the card is inserted can use more than one mode of communication, as explained below.

The priority criterion can be the maximum transmission speed of the modes of communication of the terminal, the quantity of data to be exchanged with said server or the cost of the call between the terminal and the server for a given mode of communication.

The output of the selector means 9 is connected to means 11 for delivering the selected parameter set to said terminal to enable access to the chosen application from said terminal.

The reader 5 of the terminal 3 further comprises means 13 for supplying the identity of each mode of communication used by said terminal to said recognition means 7 of the microchip card 1 and means 15 for recovering the parameter set delivered by said delivery means.

The output of the recovery means 15 is connected to means 17 for processing the set of parameters supplied by the means 11 to establish access to said chosen application of the server 4.

The communication system operates in accordance with the method of the invention, which is shown in the form of a flowchart in FIG. 2.

To enable a user to access one or more chosen applications on the server 4 from one of the terminals 3 of the heterogeneous group, in a step 30 the memory means 6 store at least one and preferably several sets of parameters specific to the modes of communication and to the application(s) chosen. E This step can be performed by the business that authorizes access and issues the microchip card 1, for example, or these details can be downloaded.

When the sets of parameters have been stored in the means 6, the microchip card 1 of the invention is operational.

The microchip card 1 is then inserted in the terminal 3. During a step 32, the means 13 of the terminal supply to the recognition means 7 the modes of communication that the terminal uses.

Then, in step 34, a set of parameters corresponding on the one hand to the recognized mode of communication of said terminal, or one of the recognized modes, and to the chosen application is selected. This selection process allows for the priority criterion stored in the memory means 10, for example a quantity of data to be exchanged.

Finally, in step 36, the means 11 deliver the selected set of parameters to said terminal 3 to enable activation of access to the chosen application from said terminal 3 in a subsequent step 38.

To this end, the means 15 recover the selected parameter set and transfer it into the processor means 17 of the terminal 3.

Clearly, therefore, the communication system and the method of the invention considerably simplify access by a user to a chosen remote application of a server. The user can employ different terminals interchangeably to access the some application. From the point of view of the user, access to the chosen application is transparent.

Furthermore, the initial negotiation between the card 1 and the terminal 3, during which the terminal 3 specifies through its means 13 the modes of communication it can use, enables the most appropriate mode of communication for the chosen application to be selected.

For an application for looking up the balance of an account, for example, it is therefore not necessary to use a call via the Internet. Exchange of information using a short message through the intermediary of the SMS (Short Message Service) is more than adequate and much less costly.

What is claimed is:

1. A microchip card for enabling a user to access at least one chosen application on a particular server by means of any communication terminal using at least one mode of communication and fitted with a reader compatible with the microchip card, which card includes:

memory means for storing sets of parameters specific to said at least one mode of communication used by said terminal and to said at least one chosen application, means for recognizing said at least one mode of communication used by said terminal, in which it is inserted, to communicate with the particular server, means, connected to said memory means and to said recognition means, for automatically selecting one of the sets of parameters, the selecting operation being based on said recognized mode of communication of said terminal and also based on said chosen application, and means for delivering the selected parameter set to said terminal to enable access to said chosen application from said terminal;

wherein said means for recognizing recognizes said at least one mode of communication of the set of communication systems consisting of:
cable communication systems,
cellular communication systems,
cordless telephone systems, and
landline telephony systems.

2. The microchip card claimed in claim 1, wherein each set of parameters includes an address, a protocol type, protocol parameters and data relating to security and to the right of access to said chosen application, said address and said protocol type of each set of parameters being compatible with said mode of communication or one of said modes of communication used by said terminal.

3. The microchip card claimed in claim 1, wherein said terminal can use several communication modes, further comprising memory means for storing a priority criterion connected to said selector means.

4. The microchip card claimed in claim 3 wherein said priority criterion is a criterion included in the following group: the maximum transmission speed of a mode of communication, the quantity of data to be exchanged with said server, the cost of the call between said terminal and said server for a given mode of communication.

5. The microchip card claimed in claim 1, wherein said memory means comprise at least two sets of parameters respectively corresponding to two different applications.

6. A communication terminal using at least one mode of communication and equipped with a reader compatible with a microchip card as claimed in claim 1, comprising:

means for supplying the identity of each mode of communication used by said terminal to said recognition means of said microchip card, means for recovering said set of parameters delivered by said delivery means, and means for processing said delivered set of parameters to establish access to said chosen application.

7. The terminal claimed in claim 6, having one of the types from the following group: cable telephone terminal, cellular telephone terminal, cordless telephone terminal, microcomputer.

8. A communication system which comprises at least one microchip card as claimed in claim 1, at least one terminal and at least one server of at least one application.

9. A method of allowing a user to access at least one chosen application of a particular server by means of a communication terminal of any kind using at least one communication mode and equipped with a microchip card reader, which method includes the following steps:

memorizing in a microchip card sets of parameters including a set of parameters specific to said at least one communication mode used by said terminal and to said at least one chosen application, wherein said communication mode is at least one mode of communication of the set of communication systems consisting of:
cable communication systems,
cellular communication systems,
cordless telephone systems, and
landline telephony systems;

said microchip card recognizing said at least one mode of communication used by said terminal, in which it is inserted, to communicate with said particular server, said microchip card automatically selecting a set of parameters based on said recognized communication mode of said terminal and to said at least one chosen application, and said microchip card delivering the selected set of parameters to said terminal, said terminal accessing said chosen application using said recognized communication mode and said selected set of parameters.

10. The method claimed in claim 9, wherein each stored set of parameters includes an address, a protocol type, protocol parameters and data relating to security and to the right of access to said chosen application, the address and the protocol type of each set of parameters being compatible with a single mode of communication used by said terminal.

11. The method claimed in claim 9, wherein said terminal can use more than one mode of communication and a priority criterion is taken into account in the step selecting one of the recognized modes of communication.

12. The method claimed in claim 11, wherein said priority criterion is a criterion included in the following group: the maximum speed of transmission of a mode of communication, the quantity of data to be exchanged with said server, the cost of the call between said terminal and said server for a given mode of communication.

13. The method claimed in claim 9 wherein said set of parameters is downloaded to said microchip card, to be memorized, from said server of said chosen application.

* * * * *